United States Patent [19]

Dowdle et al.

[11] Patent Number: 5,100,270

[45] Date of Patent: Mar. 31, 1992

[54] APPARATUS AND METHOD FOR CUTTING MAT BOARD

[75] Inventors: Robert K. Dowdle, South Jordan; Barton K. Dowdle, West Jordan, both of Utah

[73] Assignee: Artistic Mat, Inc., Midvale, Utah

[21] Appl. No.: 490,045

[22] Filed: Mar. 6, 1990

[51] Int. Cl.$^5$ .................... B23C 3/00; B27C 5/02
[52] U.S. Cl. ........................ 409/132; 83/56; 83/100; 144/252 R; 409/137; 409/192; 409/202; 409/203
[58] Field of Search .......... 409/189, 190, 191, 197, 409/132, 136, 137, 192, 202, 203, 205, 217, 232, 233; 83/100, 168, 56, 577; 144/252 R, 365; 408/56, 58, 61

[56] References Cited

U.S. PATENT DOCUMENTS

| | | | |
|---|---|---|---|
| 3,413,893 | 12/1968 | Wilson | 409/217 |
| 3,880,047 | 4/1975 | Dosier | 83/100 X |
| 3,967,519 | 7/1976 | Esterly . | |
| 3,996,827 | 12/1976 | Logan . | |
| 4,158,977 | 6/1979 | Logan . | |
| 4,158,987 | 6/1979 | Smith | 409/190 |
| 4,244,669 | 1/1981 | Puritz et al. | 409/137 |
| 4,413,542 | 11/1983 | Rempel . | |
| 4,440,055 | 4/1984 | Gelfand . | |
| 4,505,174 | 3/1985 | Carithers, Jr. . | |
| 4,567,797 | 2/1986 | Folk | 83/56 |
| 4,590,834 | 5/1986 | Sobel . | |
| 4,596,171 | 6/1986 | Gerber | 83/56 |
| 4,599,925 | 7/1986 | Rom | 83/56 |
| 4,641,556 | 2/1987 | Vigneron et al. . | |
| 4,662,258 | 5/1987 | Mood . | |
| 4,747,330 | 5/1988 | Carithers, Jr. . | |
| 4,798,112 | 1/1989 | Kozyrski et al. . | |
| 4,822,219 | 4/1989 | Wood et al. | 409/137 |

FOREIGN PATENT DOCUMENTS 3734127 4/1989 Fed. Rep. of Germany ...... 409/137

Primary Examiner—Z. R. Bilinsky
Attorney, Agent, or Firm—Trask, Britt & Rossa

[57] ABSTRACT

The present invention relates to a method and apparatus for cutting mat board, and more specifically for cutting apertures including non-linear boundaries in mat board. The preferred embodiment of the apparatus of the present invention includes an automatically controlled rotating cutting tool, preferably with a V-bit for cutting apertures having bevelled boundaries according to a predetermined pattern. The preferred embodiment of the method of the present invention includes stacking first and second mat boards and cutting through said first board into said second, removing said first board into said second, removing said first board, and cutting the same aperture in the same location in said second mat board which has been stacked on a third, uncut mat board.

24 Claims, 6 Drawing Sheets

APPARATUS AND METHOD FOR CUTTING MAT BOARD

BACKGROUND OF THE INVENTION

The present invention relates to the cutting of windows and designs in so-called artist's mats or mat board, and more specifically to an apparatus and method for cutting such apertures in configurations heretofore achievable only by custom hand-cutting by an experienced artisan, but with much greater accuracy and in volumes greatly exceeding those achievable by hand-cutting.

The framing of photographs, prints and other substantially, two-dimensional works, such as certificates, diplomas, etc., is normally effected by using a mat with a window cut therein laid over the work to enhance and focus the viewer's attention on the work. The stock from which the mat is formed is usually paper in the form of cardboard, in some instances having a surface finish of a different color than the interior of the board, chosen to complement the work, the frame for the work, the color scheme of a room in which the work is to be displayed, or it may be ivory, white or other neutral shades. The texture of the board can be rough or smooth, imprinted or embossed with a secondary color, design or pattern, or covered with a fabric or other material.

While it is possible, and in most cases easier, to cut a window in mat board using a straight cut, that is to say a cut perpendicular to the plane of the mat, esthetics and purchaser preference dictate that the window be cut on a bevel, or oblique angle to the plane of the board. Commonly used bevel angles are 30°, 45° and 60° to the plane of the mat, the increasing angle giving less exposure of the interior color of the mat to the viewer as the window border provided by the cut becomes narrower. It is also known to laminate two different colors of mat board, with aligned but differently sized windows to provide a contrasting border around the work to be framed.

Throughout the years, in fact for the past century, many attempts have been made to expedite the making of bevel cuts, and to increase both accuracy of such cuts beyond that achievable by manual cutting. U.S. Pat. Nos. 3,967,519, 3,996,827, 4,158,977, 4,413,542, 4,440,055, 4,590,834, 4,747,330 and 4,798,112 each disclose certain improvements and enhancements for manual mat cutting with blades mounted for bevel cuts on rails, trolleys or other supports to permit the making of linear bevel cuts. Others working in the art have attempted to automate the cutting process to some extent, generally by mounting cutting blades on pneumatic cylinders for advancement into and retraction from the mat board, and means for moving the blades along a rail or trolley in response to operator direction or some other control means. U.S. Pat. Nos. 4,505,174, 4,641,556 and 4,662,258 exemplify this type of prior art apparatus and cutting method.

All of the prior art methods and apparatus possess major shortcomings, most notable being the inability to cut at high speed with repeatable accuracy and the total inability to cut non-linear windows and designs in the mat board. Blade cutting techniques of necessity require that the blade be unsupported over the length extended into the mat board, which in prior art devices causes lateral blade flex, and resistance of the board to the linear advancement of the blade causes blade wander, wobble or flutter in response to the resistance of the board if the blade is moved too fast or laterally stressed to any great extent. Attempts have been made to solve the former problem, see U.S. Pat. No. 4,662,258 referenced above, but the latter problem remains unsolved. Moreover, attempting to cut arcs, particularly arcs of small radius, such as under one foot radius, aggravates the flexing of the blades by placing them under stress from several directions, resulting in uneven bevel angles and resulting borders of different widths, and a defective product.

SUMMARY OF THE INVENTION

In contrast to the prior art, the apparatus and method of the present invention provides the ability to cut mat board in high volume with extreme accuracy, and to cut both linear and non-linear windows, designs, patterns and other features in mat board.

More particularly, the apparatus of the present invention comprises, in its simplest form, a router mounted perpendicularly to the mat board to be cut and moveable laterally in any direction as well as vertically to permit engagement and disengagement of a V-groove router bit with the mat board. A resiliently biased presser foot is mounted in close proximity to the router bit to provide localized pressure in the region of the board being cut, and preferably includes an aperture in the side thereof to permit the downwardly-directed air flow from the router drive to blow mat chips and dust out of the area enclosed by the presser foot and away from the router bit so as to facilitate a clean cut.

In the preferred embodiment, a plurality of routers are ganged together on a router jig oriented parallel to the cutting table on which the mat board is supported, the jig being secured to the tool guide of a three-axis computer or other numerically controlled machine tool. The mat board is then secured at its edges to the workpiece support surface, and the vertical and horizontal movement of the ganged routers is controlled by the machine tool according to a predetermined program. A brush extends laterally behind the ganged routers between the jig and the mat board, and sweeps cuttings and dust which are then pulled into vacuum intake line at the center of the brush.

The method of utilizing the apparatus includes stacking two mat boards in alignment on the cutting table, securing both, and making the desired cuts in the top board while extending the tip of the router bit a small distance into the lower board. When the top board has been cut, it is removed, and the slightly scored bottom board is then used as the new top board, resting on a new, unscored bottom board. Further, as has been primarily alluded to, the method includes cutting a large plurality of mat windows of different size but in aligned position on two separate boards of contrasting color, aligning the boards, laminating them, and then cutting apart the pre-aligned, pre-assembled individual mats.

Using the present invention, two, three, four or more patterns in the same number of what will be furnished mat boards can be cut at the same time. The use of the machine tool X-Y axis program capability in conjunction with the high speed router bit affords the ability to cut windows, designs and patterns with arcs as small as the diameter of the router bit and as large as the workpiece support or machine tool travel can accommodate, as well as the connection of linear and non-linear edges in a continuous, esthetically pleasing manner or, if desired, sharp corners may also be cut. An alternative embodiment utilizing an ultrasonic cutting tool in lieu of a router bit is also disclosed.

BRIEF DESCRIPTION OF THE DRAWINGS

The apparatus and method of the present invention will be more fully appreciated by one of ordinary skill in the art through a review of the following detailed description of the preferred embodiment in conjunction with the accompanying drawings, wherein.

DETAILED DESCRIPTION OF THE PREFERRED EMBODIMENTS OF THE PRESENT INVENTION

Figure 1:
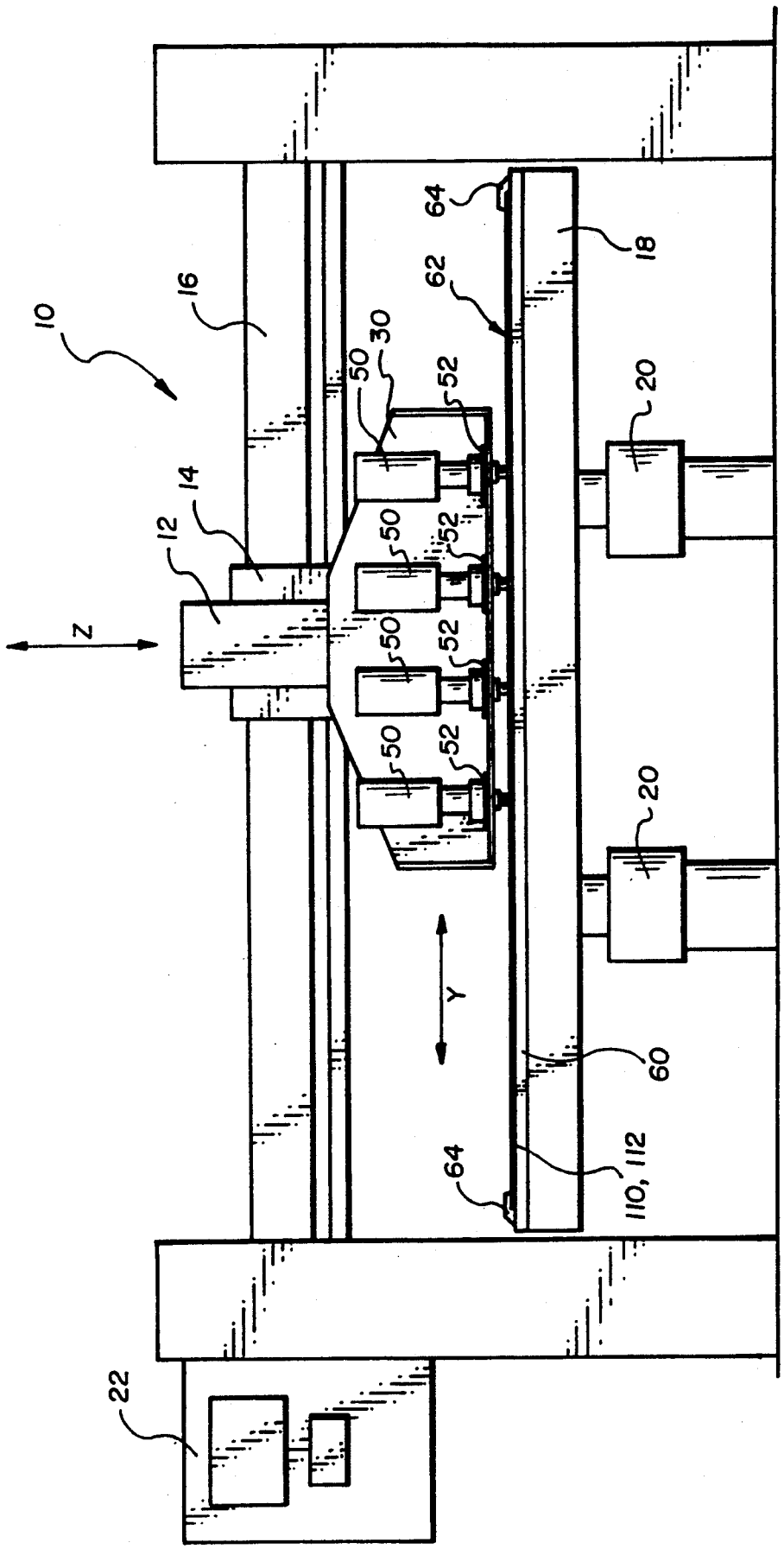
FIG. 1 comprises a front elevation of the preferred embodiment of the apparatus of the present invention.
Figure 2:
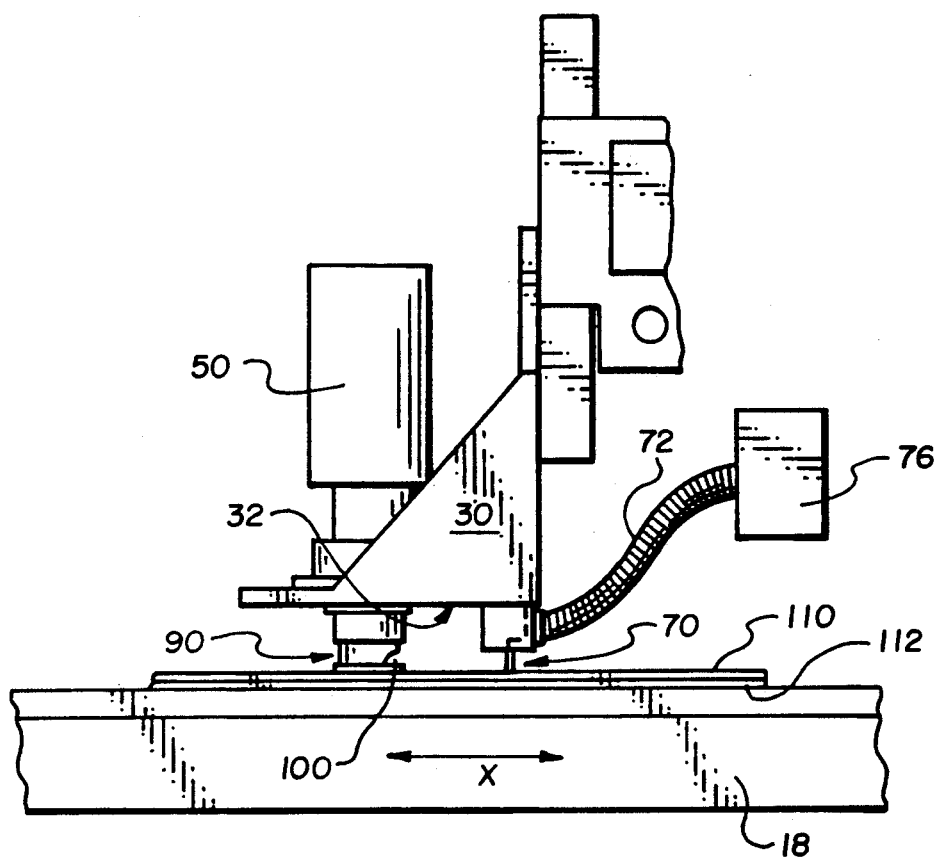
FIG. 2 comprises an enlarged side elevation of the router jig assembly of the preferred embodiment of the apparatus of the present invention.

Referring to FIGS. 1 and 2, a general description of the preferred embodiment of the apparatus of the present invention follows. Reference numeral 10 is employed to identify a three-axis computer numeric control (CNC) machine tool having a vertically moveable (arrow Z) tool guide 12 supported by carriage 14 which is laterally moveable (arrow Y) on guide rail 16, and having an aluminum platen 18 which is horizontally moveable (arrow X) perpendicular to the direction of guide rail 16 on two parallel guide rails 20. Thus, tool guide 12, and any tool to which it is secured, can be moved in the Y and Z direction, and platen 18 in the X direction, so that a mat board workpiece secured to the platen 18 experience can experience movement relative to the tool guide in any or all of the three directions. The means for effecting such movement are various and known in the art, and include hydraulics, pneumatics, screw drives, magnetic linear actuators, the exact movement means not forming a part of the present invention.

The movement means are activated and deactivated with high precision via a CNC control unit 22 so that tight dimensional tolerances of the cuts in the mat board can be maintained. A suitable unit comprising the CNC control unit, as well as pneumatic movement means and the aforementioned three-axis capability, is the Fagor Model 8010M, produced by Aurki Corporation of Elk Grove Village, Ill. However, other suitable CNC machine tools, including those possessing the three-axis capability in the tool guide and a stationary platen are also available.

Figure 5:
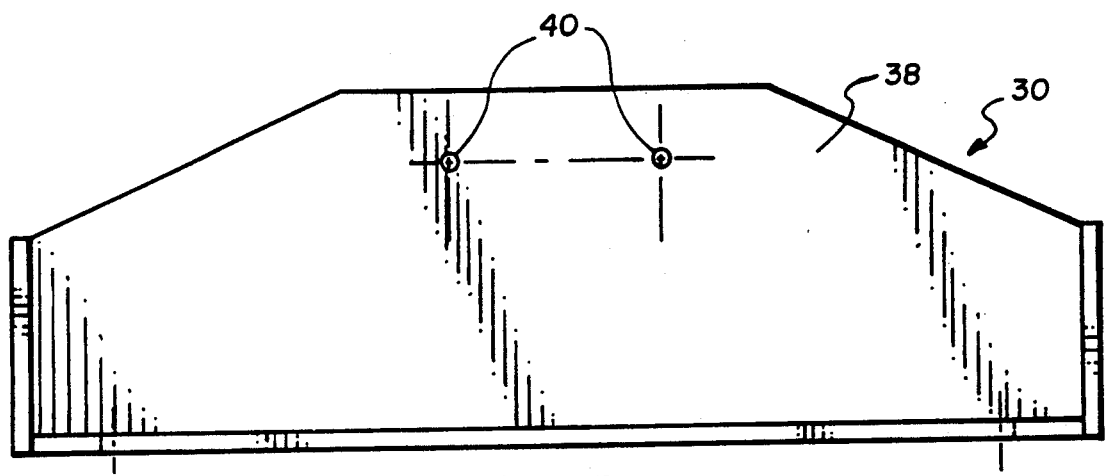
FIGS. 5, 5A and 5B comprise, respectively, front, bottom and side elevations of the router jig employed in the present invention.
Figure 5A:
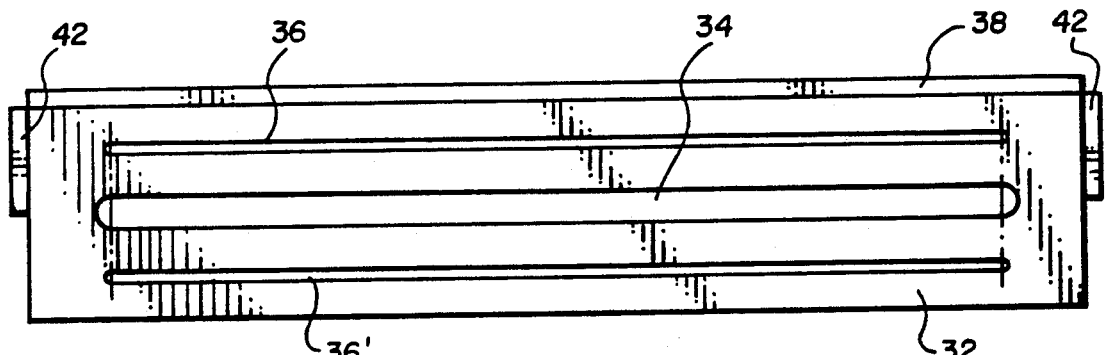
Figure 5B:
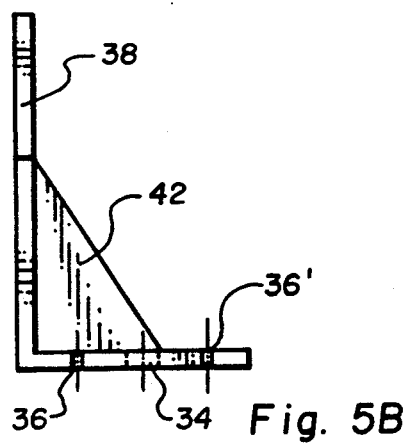

In the preferred embodiment of the invention, as shown in FIG. 1, a router jig 30 is secured by bolts (not shown) to tool guide 12. Router jig 30, as depicted in FIGS. 5, 5A and 5B, comprises a horizontal laterally extending base 32 having a large center router bit slot 34 flanked by parallel router mounting slots 36 and 36'. The rear of base 32 is secured, as by welding, to vertical tool guide plate 38 having two holes 40 therein for bolting jig 30 to tool guide 12 as previously described. At each end of base 30 and plate 38, triangular side braces 42 are secured to both to give the jig 30 rigidity.

Turning again to FIG. 1, a plurality of routers 50, in this case four routers, are vertically mounted to jig 30, the router bits 54 extending downward through router bit slot 34 of base 32, and the routers aligned along router bit slot 34 and secured to base 32 by suitable fastener means known in the art (not shown), such as screws and wing nuts on lock washers, extending through mounting slots 36 and 36' and through holes in the router bases 52. Routers can be standard electrically powered woodworking routers operating at speeds from 20,000 to 40,000, and preferably 30,000 r.p.m., and one suitable router is the Model 7604, manufactured by Black & Decker (U.S.) Inc. of Hunt Valley, Mo.

Figure 6:
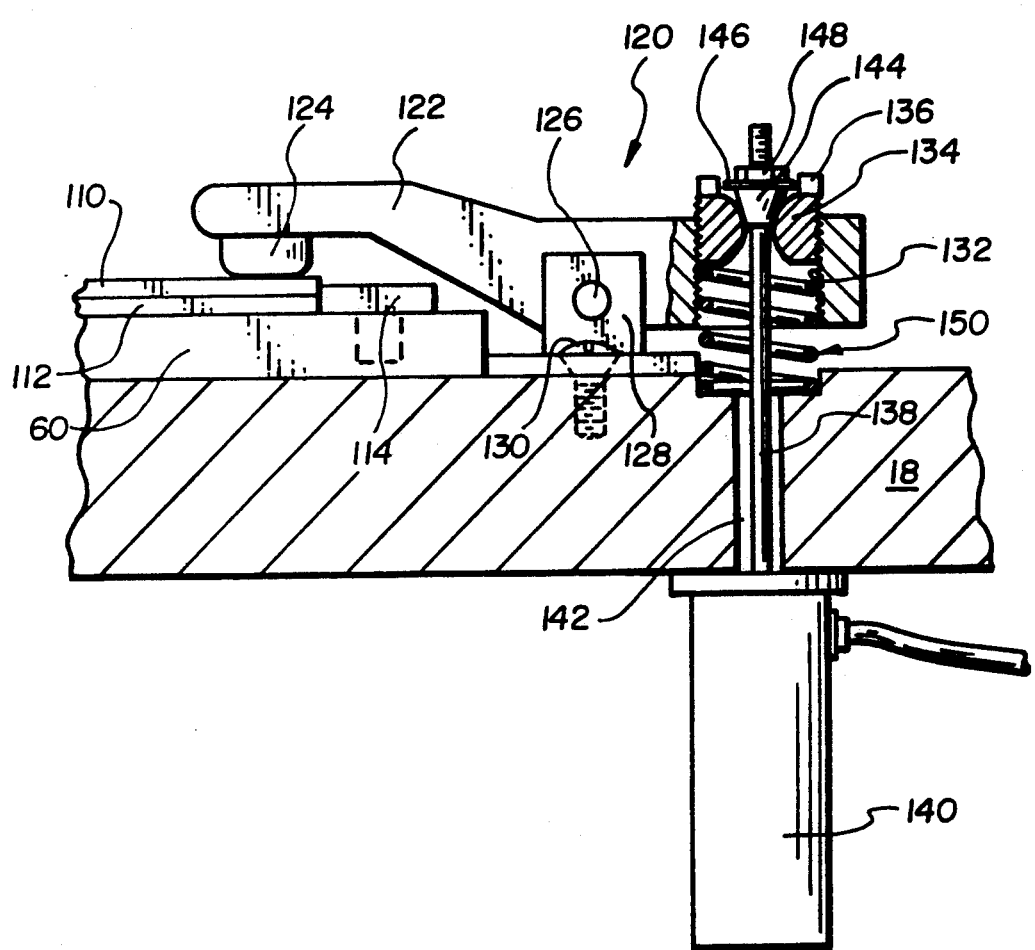
FIG. 6 comprises a side partial sectional elevation of a mat board hold down mechanism suitable for use in the present invention.

In order to adopt the above-described apparatus to mat cutting, the platen 18 of the CNC machine tool 10 is covered with a poured layer of fiberglass resin and binder material 60 machined with an end mill after setting up to provide a perfectly flat cutting table 62 which is highly durable although resilient in comparison to the aluminum platen 18, and which is not dimensionally affected by changes in temperature and humidity. Automotive body putty is preferred as a filler or binder material. Also added to the periphery of platen 18 are a plurality of mat board hold downs 64, which can be as simple as spring clamps but which are preferably pneumatically or electrically actuable for speed and precision of alignment of the mat board prior to cutting. One suitable mechanism 120 is depicted in FIG. 6 of the drawings. Hold down 120 comprises a lever arm 122 having a hold down pad 124 at its inner (board) end, for contacting the top mat board 110 stacked on bottom board 112, the rationale for the uses of stacked boards being discussed hereafter in detail. Boards 110 and 112 are aligned via the use of guides 114 secured to platen 18 around the edges of cutting table 62. Lever arm 122 pivots on pin 126 of cradle 128, which is secured to platen 18 by screws 130. Lever arm 122 includes at its outer end a threaded spring compression adjustment bore 132, wherein is threaded adjustment collar 134 having adjustment studs 136 at the top thereof. Power rod 136 extends upwardly from pneumatic cylinder or solenoid power means 140 below platen 18 through bore 142 into adjustment bore 132, where it is topped by frustoconical adjustment sleeve 144, lock washer 146, and nut 148, which is threaded onto the top thereof. Spring 150 surrounds rod 138 and provides a resilient hold down force for boards 110 and 112 when power means 140 is deactivated. The degree of compressional hold down force can be readily adjusted through rotation of collar 134 via studs 136, and of sleeve 144. A plurality of hold-downs 120 are placed around the periphery of the stacked boards 110 and 112, and are actuable in response to a single switch, such as a foot switch, to release the boards simultaneously and re-grip a new board stack in a matter of seconds, limited only by the speed of board feed, alignment and removal. It is contemplated that a dual-action power means for positive movement of hold down 120 in both engaging and releasing mat board 110, with dual springs also utilized as rebound compensators.

As can be seen in FIG. 2 of the drawings, base 32 of router jig 30 has attached to the entire rear side thereof a debris brush 70 and a vacuum hose 72 extending to an aperture 74 in the center of the brush 70 for removal of mat board chips and dust generated during the cutting operation. Such an arrangement is necessary to prevent the debris from interfering with the router bit and causing gouges and other defects in the window or pattern edge being cut. Vacuum unit 76 can be any commercially available assembly having sufficient power to remove the mat debris.

It was originally contemplated that a normal high speed tool steel V-shaped router bit could be employed to cut the mat board, but it was discovered that such material dulled quickly with corresponding deterioration in the quality of cut. Experimentation revealed that a tungsten carbide V-bit 54 would provide a good cut with adequate endurance. A suitable bit 54 is produced as Part number 041200V19 by Leitz of West Germany. For optimum results, this bit is ground to a mirror finish on a 500–1200 grit, preferably 800 grit or higher, grinding wheel. Moreover, it is believed that lapping a mirror finish bit may further improve cut quality. The angle of the preferred bit to vertical is forty-five degrees (45°), to give a corresponding bevel angle on the cut mat board.

In developing the present invention, it was discovered that certain requirements, most due to the nature of the mat board material, must be addressed to produce a product with commercially acceptable characteristics. First, as noted above, one must employ a sharp, durable V-groove tool (bit). Second, the mat board must be secured firmly into its properly aligned position to eliminate board shifting and slippage during cutting, which problem is aggravated by the use in the preferred embodiment of multiple, ganged routers, each router bit adding a side force drag. This point is addressed by the use of an adequate number of sufficiently strong hold downs at the edge of the mat board. Next, a new surface must be cut into on each cut, and the cut must be continued to finish the window, pattern or design to avoid dimples, gouges or other imperfections evidencing bit entry into the mat board. Finally, the mat board must be pressed completely flat proximate the point being cut by router bit 54.

Figure 3:
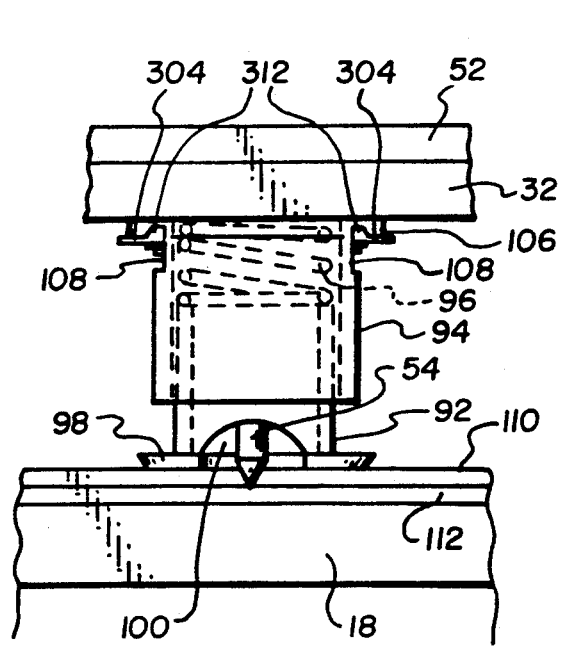
FIG. 3 comprises an enlarged rear view of a single router bit and presser foot employed in the present invention as the bit engages the mat board.
Figure 4:
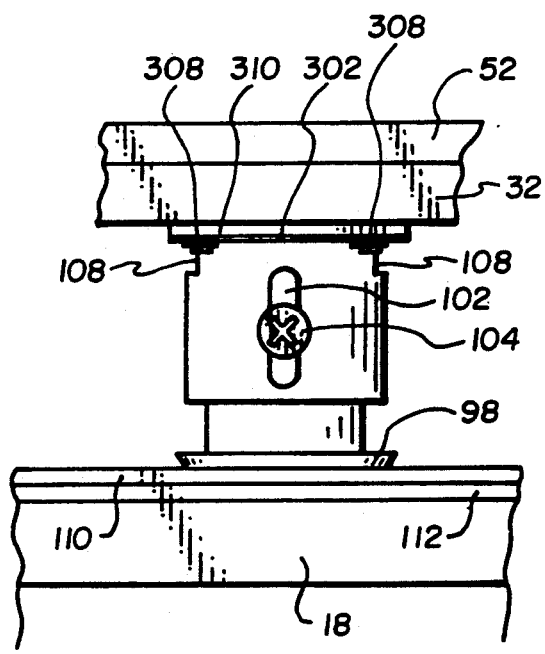
FIG. 4 comprises an enlarged front view of the presser foot employed in the present invention.

The last point has been accommodated, as shown in FIGS. 3 and 4, by a presser foot 90 which may be secured to the bottom of router jig base 32 by the same means securing the routers 50 to the top thereof, but is preferably secured thereto by a spring clip assembly 300, as will be described hereinafter with respect to FIGS. 3, 4 and 9. Presser foot 90 can be formed of any suitable material, but a suitable and readily available material is polyvinyl chloride (PVC) pipe. Presser foot assembly 90 comprises inner foot 92, which is telescopingly received inside outer housing 94, foot 92 being downwardly but resiliently biased against the mat board by spring means 96, which can be a coil spring as shown, or other suitable means, such as Belleville springs, wave springs, an elastomeric washer or tube, or other means known in the art. At the bottom of foot 92, circumferential foot pad 98 increases the footprint, and hence the area of the mat board surrounding bit 54 and subject to the resilient pressure exerted by presser foot assembly 90. At one side of tubular foot 92, preferably the rear side as shown in FIG. 2, window 100 is cut through the wall thereof as well as through part of the circumference of foot pad 98. Window 100 permits the exit of board chips and dust from the interior of presser foot assembly 90, under pressure of the downward air flow from the router which is used to cool the motor thereof. The rearward orientation of window 100 directs the debris flow back toward brush 70 and aperture 74 connected via hose 72 to vacuum unit 76. In order to maintain the desired orientation of window 100, vertical slot 102 in outer housing 94 slidingly engages screw 104 which is secured to inner foot 92, thus permitting upward and downward movement of inner foot 92 as router jig 30 moves routers 50 downward against and upward away from the mat board as a cut is started and finished, while preventing rotation of the inner foot 92 and of window 100.

Figure 9:
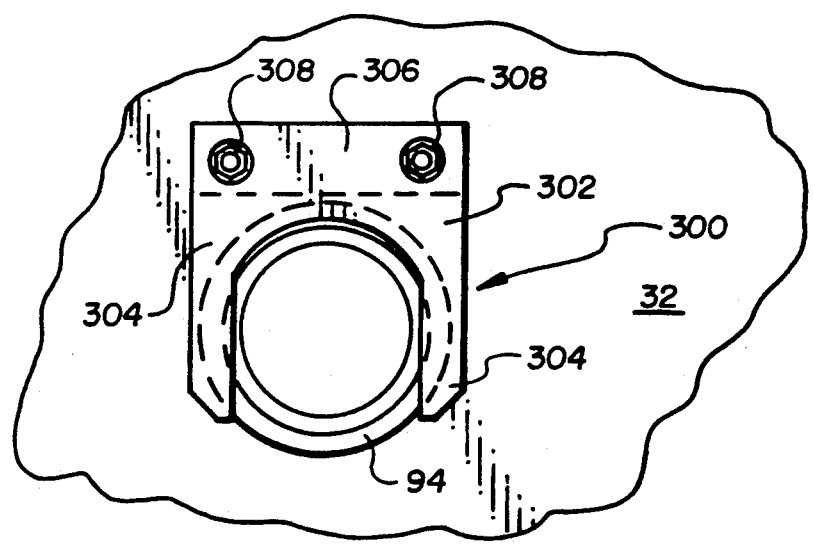
FIG. 9 comprises a bottom view of a router jig with a spring clip assembly holding a presser foot assembly outer housing in place.

Referring to FIG. 9, presser foot assembly 90 is preferably secured to router jig base 32 by a spring clip assembly 300, as previously noted, for several reasons. Spring clip assembly 300 includes a u-shaped steel spring clip 302 having parallel legs 304 joined to a perpendicularly extending base 308. Base 306 is secured to router jig base 32 by screws 308, and is spaced therefrom by shim 310. Legs 304 pass on opposite sides of outer housing 94 adjacent base flange 106 and through slots 108 cut into the outer wall of outer housing 94. The lateral distance between the bases of the slots 108 is only slightly less than between legs 304, so that legs 304 automatically orient outer housing 94 and thus inner foot 92 with respect to router jig base 32. Moreover, assembly 300 permits rapid replacement of presser feet 90 as they wear or break. Tabs 312 and the free ends of each leg 304 prevent the presser foot assemblies 90 from coming free under the vibration of the routers 52.

While the apparatus of the present invention includes many novel and unobvious modifications and improvements to the prior art, the method of utilizing the apparatus and in fact the entire method of producing mats will be appreciated by the skilled artisan as equally novel and unobvious.

One radical departure from prior art mat cutting techniques is the use of stacked mat boards on the cutting table 62 or fiberglass-covered platen, which precludes the use of a vacuum hold-down as the sole hold-down means, since such a device would only hold the bottom sheet. It has been discovered that using a bottom sheet of mat board, and programming the CNC control unit 22 to extend the tip of the router bit 54 all the way through the top sheet of mat board 110 into the bottom sheet 112 (see FIG. 3) five to six hundredths of an inch results in an exceedingly clean and complete cut without significantly damaging the surface of bottom board 112.

Figure 7:
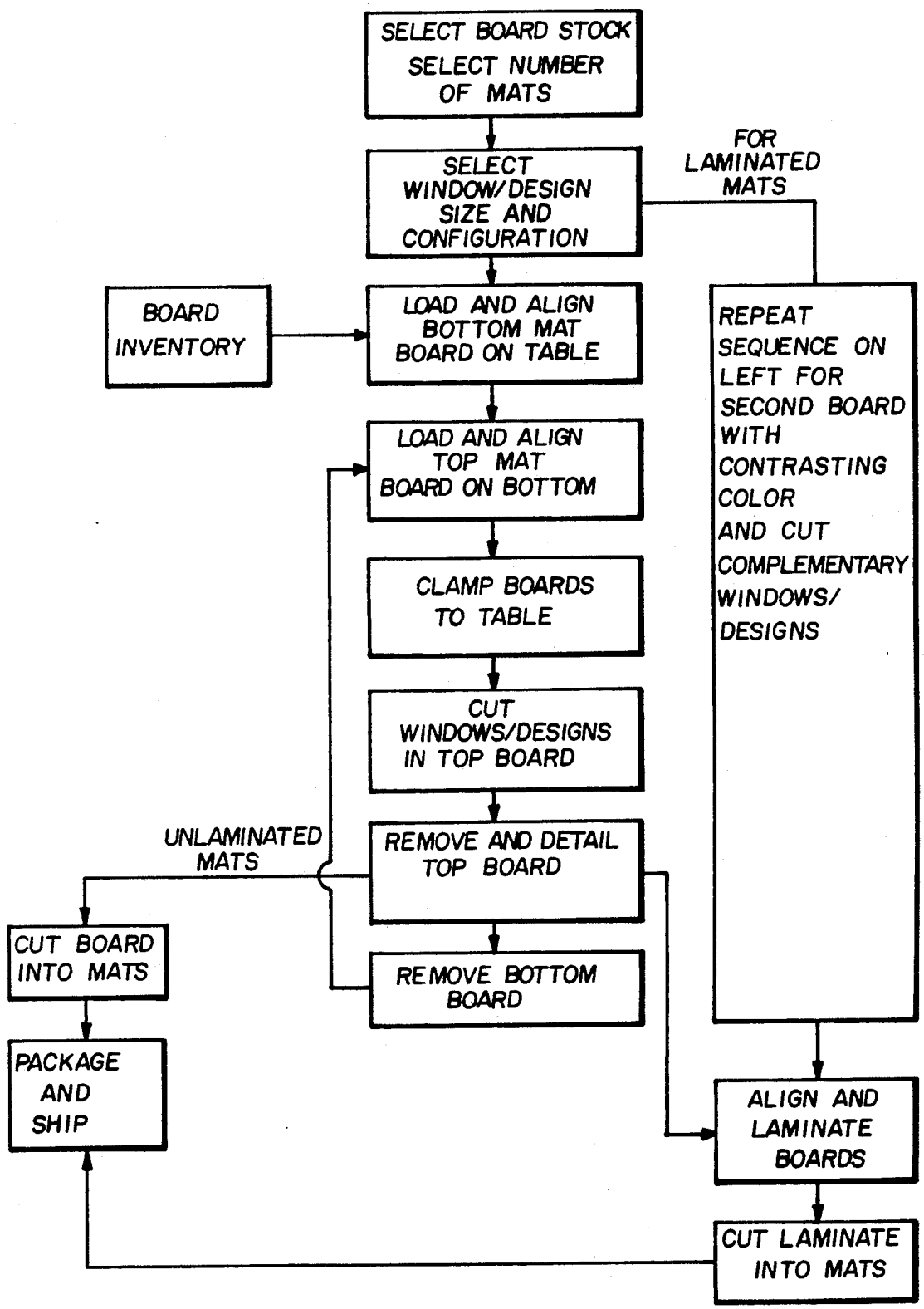
FIG. 7 comprises a flow chart of the method of manufacturing a completed mat board in accordance with the present invention.

As shown in FIG. 7 of the drawings, to conduct a cutting operation using the apparatus of the preferred embodiment, the size of board stock and the number of mats to be cut therefrom is selected. If four routers 50 are mounted on jig 30, then a maximum number of four (4) mats can be cut concurrently, with subsequent groups of four being cut as the tool guide 12 is displaced in the X-direction and platen 18 is displaced in the Y-direction with respect to router jig 30. Thus, it is perfectly feasible, using the method and apparatus of the present invention, to cut dozens of mats from a single sheet of mat board, the only constraints being the size of the mat board stock, the size of finished mats desired and the available X and Y travel of CNC machine tool 10.

Next, the window size and configuration and other designs or patterns, if any, to be cut into each mat is selected and a suitable program therefor is entered into CNC control unit 22. A program in "G" code for cutting a five (5) inch by seven (7) inch oval window is used in the above-referenced commercially available CNC machine tool would read as follows:

```
1!00061
2!N5 G22 N57
3!N10 G05
4!N15 G00 G90
5!N20 X2.563 Y7.6141
6!N25 G01 Z2.82 F1000
7!N30 G02 X3.5368 Y8.1894  |1.5675 J −1.5413 F700
8!N35 G02 X4.8481 Y8.0425  |.4661 J −1.7655
9!N40 G02 X5.7441 Y7.2576  | −1.1919 J −2.2645
10!N45 G02 X6.3283 Y6.0246 | −3.1103 J −2.2287
11!N50 G02 X6.4965 Y4.5637 | −4.6111 J −1.2707
12!N55 G02 X6.2184 Y3.1362 | −4.6255 J.1602
13!N60 G02 X5.5438 Y1.9971 | −3.2925 J1.1805
14!N65 G02 X4.3318 Y1.281  | −1.6867 J1.471
15!N70 G02 X3.2783 Y1.399  | −.3328 J1.7904
16!N75 G02 X2.1631 Y2.3759 |1.0883 J2.3674
17!N80 G02 X1.5565 Y4.0102 |3.5218 J2.2369
18!N85 G02 X1.6265 Y5.8493 |4.7962 J.7383
19!N90 G02 X2.563 Y7.6141  |3.5661 J −.7615
20!N95 G02 X3.5368 Y8.1894 |1.5675 J −1.5413
21!N100 G00 Z2.
22!N105 G24
23!N110M30
```

"G" code, which is well known in the machine tool art, employes a series of variables to define the direction, location and rate of tool movement. For example, in Program Step 5 above, X2.563 Y7.6141 defines the point of entry for the router bit in terms of the X and Y coordinates of the cutting table 62 or a defined portion thereof, since a plurality of mat windows will normally be cut simultaneously. Program Step 6 commands machine tool 10 to move router jig 30 linearly (G01) in the Z (vertical) direction 2.82 inches (Z2.82) at a speed of 100 inches per minute (F1000), causing router bits 54 to penetrate top mat board 110 and enter mat board 112. Program Step 7 then commands machine tool 10 to move router jig 30 circularly clockwise (G02) from the points of entry of bits 54 toward a final point defined in X and Y coordinates (X3.5368 Y8.1894) in an arc, the center of which is also defined in X and Y coordinates (I 1.5675 J-1.5413), at a rate of 70 inches per minute (F700). Program Steps 7-20 then define a series of connected accurate movements for router jig 30 which together result in the oval window being cut, router jig 30 then being raised in Program Step 21. It is important to note that clockwise movement of the router jig is desirable due to the clockwise rotation of the router bits, counterclockwise rotation producing, in our experience, a rougher cut edge.

Of course, other window shapes may readily be programmed, as well as other decorative designs and patterns, including by way of example and not limitation, sailboats, teddy bears and balloons. Partial cutting through the mat board to decoratively expose the inner color of the board is also programmable.

Square corners having sharp, esthetically pleasing edges may also be cut using the present invention by programming machine tool 10 to cause router bits 54 to exit and mat board 110 at simultaneous 45° angles in the X, Y and Z directions, thereby avoiding even the small corner arc which would otherwise be caused by the router bit.

Next, the bottom mat board sheet 112 is loaded using table guides to ensure accuracy of alignment. Then, the top sheet of board 110 is loaded onto the bottom, and both securely clamped at the edges to prevent slippage. The ganged routers 50 are then moved responsive to CNC unit control, to the appropriate position to start a cut and the programmed window or other pattern is cut as the bits are moved in the Z-direction to engage the mat board to the programmed depth, the tool guide 12 and platen 18 are moved as programmed in the X and Y directions, respectively, to achieve the desired configuration of cut, and the bits withdrawn in the Z-direction at the end of the cut. This sequence may be repeated a number of times for a mat having a window as well as an auxiliary design or pattern, and then the platen and/or tool guide is indexed to provide an uncut area of board stock for the cutting of the next four mats.

After the top board mat windows and patterns/designs have been cut, it is removed from the cutting table. It should be noted that the board has not yet been separated into individual mats, the reason therefor being explained hereafter. This finished sheet is then cleaned and detailed, as the router cutting process leaves a dust residue around the mat opening, and a slightly burred edge on the colored top surface of the sheet. These are removed by wiping the sheet with an abrasive non-metallic pad, such as a Type A Very Fine 7447 Scotchbrite pad, produced by Building Service and Cleaning Products Division/3M of St. Paul, Minn.

The bottom sheet 112 is then removed from the cutting table, and a new sheet is placed thereon as the new bottom sheet aligned, and then the former bottom sheet is placed on the new bottom sheet, aligned, clamped and the cutting cycle is repeated. This procedure is repeated until the desired number of mats have been cut, and the last bottom sheet is replaced in stock until that pattern is cut again.

Since it is desirable from a commercial standpoint in many instances to laminate upper and lower mats with aligned and similarly configured but different sized windows, so as to provide a contrasting color border about the mat window and in cases wherein a pattern or design is cut in the top mat, to provide a contrasting color therebelow to accentuate the design or pattern, the method of the present invention can be adapted to provide exceptionally high-quality end products. For example, a plurality of top mat windows and designs can be cut in sheet stock, and a like plurality of bottom mat slightly smaller windows cut in sheet stock of the same size, and in identical alignment with the top mat sheet. Thereafter, the lower mat sheet is placed in an assembly guide, the top sheet is placed upside down on the lower sheet, and A.T.G. tape applied to predetermined locations on the back side of the top sheet. The top sheet is then turned over, aligned with the bottom sheet, and pressed thereon to cause the tape to bond the two sheets. The combined sheets are then cut into preassembled individual mats, the components of which have been aligned with great accuracy due to the computer controlled cuts and the mass alignment technique possible with the groupings of not yet separated mats.

Of course, if only a single layer (unlaminated) mat is desired, the mat sheet is cut into individual mats after the cleaning and detailing operation.

In either of the above cases, the individual mats (single piece or laminated assembly) are inspected and individually shrink-wrapped for shipment.

While the present invention, in its preferred embodiment, relies upon router bits as cutting tools, it is also contemplated that an ultrasonic blade-type cutting tool may be employed. The SONICUT ultrasonic trim knife, available from Technology Marketing, Inc., 6122 South Stratler Street, Salt Lake City, Utah 84107, is one suitable tool of this type. Ultrasonic cutting tools do not experience the blade wander phenomenon previously discussed in reference to the prior art, as the ultrasonic vibration of the tool tip or blade results in almost zero friction with respect to the workpiece. In addition, cutting speeds are very high, and blade wear is almost non-existent. However, a four-axis machine tool is necessary to employ an ultrasonic cutting tool in order to rotate the blade of the tool with respect to the workpiece.

Figure 8:
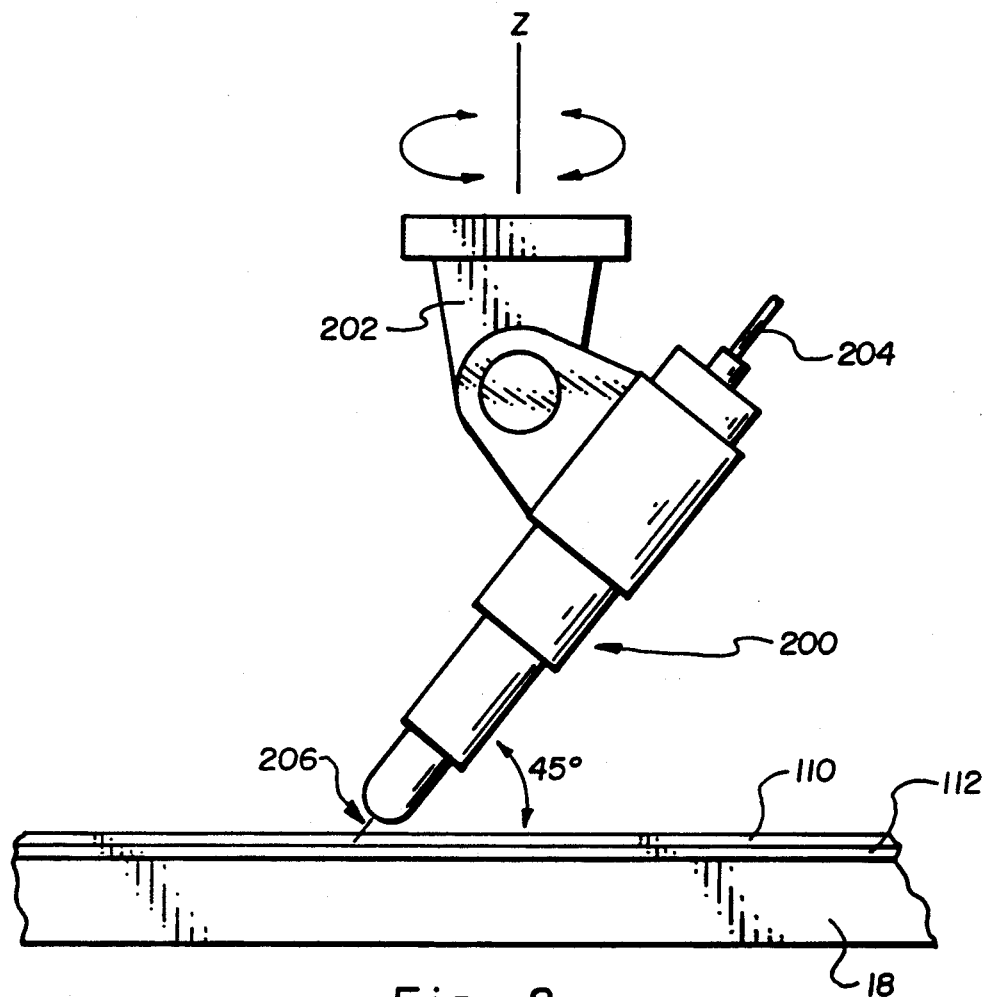
FIG. 8 comprises a schematic of an alternative embodiment of the present invention utilizing an ultrasonic cutting tool.

FIG. 8 schematically depicts an ultrasonic cutting tool 200 held at a 45° angle in a fixture 202 which is rotationally moveable in either direction about the Z axis, and which receives electrical power via cable 204 from a power supply (not shown) as is known in the art. Blade 206 is shown in place, cutting top mat board 110 and slightly penetrating mat board 112. The rotational fixture 202 must be controlled in concert with linear movements of the jig 30 and/or platen 18 so as to maintain blade 206 at an instantaneous tangent to any arc being cut in order to insure a consistent 45° angle of bevel in the cut and a smooth, continuous edge. If corners are to be cut, the four-axis machine tool may be programmed to withdraw the blade from the mat board, rotate the cutting tool 90° about the Z axis, locate the blade 206 near the point of exit but in its new orientation, and cause the blade 206 to re-enter the mat board 110 at a 45° angle at the exit point and penetrate the boards 110 and 112 to normal cutting depth as it commences its new path in the XY plane. As can be seen from the foregoing description, the use of an ultrasonic cutting blade requires a much more complex machine tool program, particularly for non-linear cuts, than is required when employing a router bit.

It is thus apparent that a novel and unobvious apparatus and method for the manufacture of artist's mats has been invented. Many modifications, additions and deletions to the preferred embodiment will be evident to one of ordinary skill in the art, such as the use of a tool guide moveable in three axes, different types of hold down means for the mat board, use of a CAD/CAM system to design and implement the desired cutting configurations, use of a diamond or boron nitride router bit for greater life, and others, without departing from the spirit and scope of the claimed invention.

We claim:

1. An apparatus for cutting mat board, comprising:
a flat cutting table for supporting said mat board;
hold down means for securing the periphery of said mat board to said cutting table;
at least one rotary cutting tool means for cutting said mat board;
presser foot means substantially surrounding said at least one cutting tool means for pressing said mat board against said cutting table proximate said at least one rotary cutting tool means, said presser foot means including rotationally fixed window means in the side thereof;
debris brush means having vacuum means associated therewith, moveable with said cutting tool means and adjacent said window means, for receiving mat debris directed therefrom by an air flow; and
means for moving said at least one rotary cutting tool means at least in the X, Y and Z directions to engage and disengage said at least one rotary cutting tool means with said mat board to effect a cut therein.

2. The apparatus of claim 1, wherein said at least one rotary cutting tool means is a router having a V-shaped router bit.

3. The apparatus of claim 2, wherein said router bit is ground to a mirror finish.

4. The apparatus of claim 1, wherein said presser foot means is resiliently biased against said mat board.

5. The apparatus of claim 1, wherein said moving means is adapted to move said cutting tool means according to a predetermined sequence.

6. The apparatus of claim 5, wherein said predetermined sequence is controlled by an automatic control means.

7. The apparatus of claim 6, wherein said automatic control means comprises a CNC unit.

8. The apparatus of claim 1, wherein said presser foot means includes a tubular foot telescopingly moveable with respect to a housing, a foot pad at the bottom of said foot, and spring means for providing said resilient biasing for said foot and foot pad.

9. The apparatus of claim 1, wherein said air flow is provided by said rotational cutting tool means.

10. The apparatus of claim 1, further comprising a cutting tool jug secured to said moving means, and a plurality of cutting tool means mounted to said jig for making a like plurality of substantially identical cuts in said mat board responsive to movement of said moving means.

11. The apparatus of claim 10, wherein said plurality of rotary cutting tool means are disposed in a linear array, and said debris brush means extends substantially coextensively with said array.

12. A method of making mats having apertures therethrough, comprising:
providing a flat cutting table;
stacking a first mat board on a second mat board in alignment therewith on said cutting table;
securing the periphery of said first and second mat boards to said cutting table; and
cutting at least one aperture in said first mat board completely through and extending said cut into but not through said second mat board.

13. The method of claim 12, wherein said cutting is done using a rotating cutting tool.

14. The method of claim 13, wherein said at least one aperture is cut by said rotating cutting tool by moving said rotary cutting tool in the X-Y plane in a path rotationally corresponding to the direction of rotation of said rotating cutting tool.

15. The method of claim 13, including the step of forming a square corner in said at least one aperture by moving said rotating cutting tool out of contact with said first mat board at simultaneous 45° angles in the X, Y and Z directions.

16. The method of claim 12, further including the step of pressing said mat boards against said cutting table in proximity to the location of said cutting.

17. The method of claim 12, further including the step of removing said first and second mat boards from said cutting table subsequent to the cutting of said first mat board, placing a third, uncut mat board on said cutting table, stacking said second mat board on top thereof in alignment thereto, and cutting a substantially identical aperture to said at least one aperture cut in said first mat board in the same location in said second mat board and extending said cut into but not through said third mat board.

18. The method of claim 12, wherein said step of cutting said at least one aperture comprises simultaneously cutting a plurality of substantially identical apertures in said first mat board.

19. The method of claim 18, further including the step of cutting subsequent pluralities of substantially identical apertures in said first mat board.

20. The method of claim 12, wherein said step of cutting comprises making a cut having at least one non-linear segment.

21. The method of claim 12, wherein said step of cutting is done using an ultrasonic cutting tool.

22. The method of claim 12, wherein said step of cutting at least one aperture comprises making one continuous cut.

23. The method of claim 12, wherein said step of cutting at least one aperture comprises making a series of contiguous cuts.

24. The method of claim 12, wherein said cut is extended into said second mat board substantially five to six hundredths of an inch.

* * * * *